(12) United States Patent
Knothe et al.

(10) Patent No.: US 8,553,973 B2
(45) Date of Patent: Oct. 8, 2013

(54) MODELING METHODS AND SYSTEMS

(75) Inventors: Reinhard Tobias Knothe, Basel (CH); Thomas Vetter, Basel (CH)

(73) Assignee: University of Basel, Basel (CH)

( * ) Notice: Subject to any disclaimer, the term of this patent is extended or adjusted under 35 U.S.C. 154(b) by 349 days.

(21) Appl. No.: 12/831,843

(22) Filed: Jul. 7, 2010

(65) Prior Publication Data

US 2011/0075916 A1 Mar. 31, 2011

Related U.S. Application Data

(60) Provisional application No. 61/223,607, filed on Jul. 7, 2009.

(51) Int. Cl.
*G06K 9/00* (2006.01)

(52) U.S. Cl.
USPC .......................................................... 382/154

(58) Field of Classification Search
None
See application file for complete search history.

(56) References Cited

U.S. PATENT DOCUMENTS

| 7,756,325 | B2 | 7/2010 | Vetter et al. | |
| 2008/0232718 | A1* | 9/2008 | Avinash et al. | 382/305 |

OTHER PUBLICATIONS

Eleyan, Face Recognition using Multiresolution PCA 2007, IEEE.*
Brennan, Principal Component Analysis with Multiresolution, Brennan, 2001, University of Florida.*
Kim, Facial Feature Extraction Using PCA and Wavelet Multi-Resolution Images, 2004, IEEE International Conference on Automatic Face and Gesture Recognition.*
Fang, Fusion of Global and Local Features for Face Verification, 2002, IEEE, 1051-4651/02.*
Heisele, Face Recognition with Support Vector Machines: Global versus Component-based Approach, 2001, IEEE Computer Vision.*
Grudin, on internal representations in face recognition systems, 2000, Pattern Recognition Society.*
Draper, Recognizing faces with PCA and ICA, 2003, Computer Vision and Image Understanding 91 115-137.*
Blanz et al., "A morphable model for the synthesis of 3D faces,"in SIGGRAPH '99: Proceedings of the 26th annual conference on Computer graphics and interactive techniques. New York, NY, USA: ACM Press/Addison-Wesley Publishing Co., pp. 187-194, 1999.
Romdhani et al., "Estimating 3D shape and texture using pixel intensity, edges, specular highlights, texture constraints and a prior," Computer Vision and Pattern Recognition, 2005. CVPR 2005. IEEE Computer Society Conference on, vol. 2, pp. 986-993, Jun. 2005.
Blanz et al., "Face recognition based on fitting a 3D morphable model," Pattern Analysis and Machine Intelligence, IEEE Transactions on, vol. 25, No. 9, pp. 1063-1074, 2003.
Turk et al., "Face recognition using eigenfaces," Computer Vision and Pattern Recognition, 1991. Proceedings CVPR '91., IEEE Computer Society Conference on, pp. 586-591, Jun 1991.

(Continued)

*Primary Examiner* — Stephen R Koziol
*Assistant Examiner* — Raphael Schwartz
(74) *Attorney, Agent, or Firm* — Joyce von Natzmer; Agris & von Natzmer LLP

(57) ABSTRACT

Methods and/or systems for modeling 3-dimensional objects (for example, human faces). In certain example embodiments, methods and/or systems usable for computer animation or static manipulation or modification of modeled images (e.g., faces), image processing, or for facial (or other object) recognition methods and/or systems.

16 Claims, 12 Drawing Sheets

(56) References Cited

OTHER PUBLICATIONS

Cootes et al., "Active shape models—their training and application," Computer Vision and Image Understanding, No. 61, pp. 38-59, 1995.
Blanz et al.,"Reconstructing the complete 3D shape of faces from partial information," it+ti Oldenburg Verlag, vol. 44, No. 6, pp. 295-302, 2002.
Burt et al., "The laplacian pyramid as a compact image code," IEEE Transactions on Communications, vol. COM-31,4, pp. 532-540, 1983. [Online]. Available: citeseer.ist.psu.edu/burt83laplacian.html.
Wimmer et al., "Learning local objective functions for robust face model fitting," Pattern Analysis and Machine Intelligence, IEEE Transactions on, vol. 30, No. 8, pp. 1357-1370, Aug. 2008.
Keller et al., "3D reconstruction of human faces from occluding contours," Proceedings of the Mirage 2007, Mar. 2007.

* cited by examiner (a) level 4        (b) level 3        (c) level 2

MODELING METHODS AND SYSTEMS

RELATED APPLICATION DATA

This application claims the benefit of priority of U.S. Patent Application No. 61/223,607, filed Jul. 7, 2009, entitled MODELING METHODS AND SYSTEMS, which is hereby incorporated by reference in its entirety. The entirety of U.S. patent application Ser. No. 11/425,252, filed Jun. 20, 2006, is also hereby incorporated by reference in its entirety. This application additionally hereby incorporates each of the references identified in the "List of References" appended hereto in their entirety by reference.

Any additional reference or publication referred to or discussed herein, including any patents (if any), even if not referenced in the paragraph above, is/are hereby incorporated by reference.

For convenience, non-patent publications are referred to herein by abbreviations corresponding to abbreviations listed in association with the appended "List of References".

FIELD OF INVENTION

This invention relates to methods and/or systems for modeling 3-dimensional (3D) objects—for example, human faces. In certain example (non-limiting) embodiments, the methods and/or systems are usable for computer animation and/or static manipulation or modification of modeled images (e.g., faces), image processing, and/or for facial (or other object) recognition methods and/or systems.

BACKGROUND OF THE INVENTION

Reconstructing the 3D shape of a human face (or other object) from a photo is an ill-posed problem and therefore requires prior knowledge, which is usually introduced in the form of a statistical model. Statistical shape models represent object classes by parameters describing the variability of the elements within the class. In contrast to models that are purely descriptive, statistical models are generative, i.e. the shape is a function of the parameters.

As but a few non-limiting examples (all examples herein—above or below—being of the non-limiting type), reconstructed 3D surfaces can be used for computer animation of faces and whole bodies, e.g., for movies or computer games or to customize 3D avatars. Such avatars are used by computer users as an alter ego in computer games or online communities. The shape can also be used indirectly to manipulate the expression or attributes of faces in photographs, e.g., by transferring the expression from one photograph to another, to exchange faces in photographs, to generate stimuli for psychological experiments, and/or for automatic face recognition.

Currently there exist two types of face recognition systems. Firstly, there are 3D face recognition systems which use a 3D scan. These systems are typically used for access control. The drawback of these systems, however, is that they require a 3D scan and can therefore only be used in a cooperative scenario, e.g., in which a person's face is being voluntarily scanned. Secondly, there are known 2D face recognition systems which use a single image or a video stream. The advantage of these systems is their potential use in uncooperative scenarios like video surveillance. However, in practice, their application is prevented by too low recognition rates of the currently available commercial systems.

Automated 2D face recognition is still one of the most challenging research topics in computer vision, and it has been demonstrated that variations in pose and light are major problems. Other problems are hair and beards and partial occlusion, e.g., from eye glasses. Most of these systems use 2D images or photos to represent the subjects in the gallery. Hence, these methods are limited in their expressiveness and therefore most face recognition systems show good results only for faces under frontal or near frontal pose. Methods that are based on fitting 3D statistical models have been proposed to overcome this issue. They are helpful to recognize people in non-frontal poses or from images with unknown illumination conditions.

Most statistical models are based on a Principle Component Analysis (PCA) of a set of training data. Turk and Pentland use a 2D PCA model to represent faces, the Eigenfaces [Turk91]. As training data set they use a set of photographs of human faces. The pictures are coarsely aligned, but not registered with dense correspondence. Their system works only well on adequate images, i.e. for pictures in frontal view with controlled illumination and without expression, e.g. passport or drivers license photographs.

Cootes and Taylor represent the face as a set of 2D points (Active Shape Models, ASM [Coop95]). As training data they also use a set of face images. But contrary to the Eigenface approach, they manually register the face images, by labeling 152 2D landmark points. The ASM is a PCA model of these face shapes in frontal view. Later, they combine this model with a PCA model of pixel intensities. This model is called Active Appearance Model (AAM). The ASM/AAM separates shape from appearance, however it does not separate between 3D pose changes and shape and between illumination and inherent color of the face. In contrast to these 2D approaches, the Morphable Model represents a face as a 3D shape with per-vertex color. The Morphable Model is a statistical model for shape and per-vertex color that is trained from a dataset of 200 densely registered 3D scans.

Blanz and Vetter used their Morphable Model to reconstruct the 3D shape of a face from a photograph. This fitting is done in an Analysis-by-Synthesis approach by optimizing a cost function that consists of the difference between the rendered model and the input photo and a term that controls the probability within the model. Romdhani and Vetter [Romd05] later improved the fitting by using a cost function that included several features extracted from the image, such as the contours, landmark points, and shading information.

PCA models are widely used, but they have some major drawbacks. PCA is focused on dimensionality reduction. The principal components are holistic, i.e., each component has global support. Hence the influence of each coefficient is not localized and affects the whole shape. As a result, there is, in general, no meaningful interpretation of the components, as can be seen in FIG. 1. Each component encodes some details of the nose and some details of the forehead and some details of the ears, etc., at the same time. This is counter-intuitive when the model is used in an interactive tool. In the context of human faces, we would expect to be able to change, e.g., the shape of the nose independently of the shape of the ear or the chin, but this is not possible with PCA models, i.e., it is not possible to change one facial feature and keep all other vertices fixed. Holistic Morphable Models are not flexible enough to locally adapt to several features at the same time.

It would be desirable if the face space spanned by the model included all reasonable human faces and excluded all non-faces. However, the space spanned by the principal components is too limited and too flexible at the same time. On the one hand, it does not span the space of all faces. Every face in this space is an affine combination of the training samples. As a result, it can poorly represent novel faces, i.e. those which are not in the database used to train the model. Hence, the PCA model is not able to represent all possible human faces. On the other hand, overfitting occurs when the model is used for generalization from partial information and is forced to adapt locally to features [Blanz02]. In particular, overfitting is a practical problem when a PCA Morphable Model is fitted to a photograph. Hence, the model is too flexible, that is—it is able to generate things that are not faces. This overfitting can be repressed by regularization on the cost of poor fitting of the partial information. One has to choose a trade-off between accuracy of the reconstruction and likelihood of the result being a face [Blanz02].

PCA-based models have other severe disadvantages. For example. the number of coefficients is limited by the number of training samples n. For instance, a training set that contains n=100 scans the model is limited to 99 components. As a result, all possible faces have to be represented by a vector of length 99. The PCA model is not flexible enough to represent novel faces and performs well only on the training data, but not on test data.

The very last components only encode noise in the training set. When one tries to adapt the PCA model locally to facial features, this is either not possible at all, or, if possible, only with severe overfitting. Overfitting occurs when an unsuitable statistical model with too many parameters is fitted to novel data. The data is matched well and the function or the surface passes through the points or vertices. However, in between, the model generates arbitrary results. Overfitting can be prevented by reducing the number of parameters of the model or by regularization. Large coefficients lead to a low prior probability. Regularization penalizes large coefficients, thereby preventing overfitting. Both approaches work in a similar way, since the most relevant components with large standard deviation are effected less by regularization than those with small standard deviation.

In view of the above enumerated drawbacks and/or desires for improvements in the art, it is a purpose of the herein described invention to address one or more of such drawbacks and/or desires as well as, or in the alternative, other needs which will become more apparent to the skilled artisan once given the present disclosure.

SUMMARY OF CERTAIN EMBODIMENTS OF THE INVENTION

Generally speaking, the present invention is directed to methods and/or systems (including, for example, component hardware) for modeling and/or processing and/or manipulating and/or recognizing 3-dimensional (3D) objects (for example, human faces). Such methods and/or systems may be, and in some cases are, embodied by or comprised in part of computer readable code written or stored on computer readable media (e.g., external hard drives or other memory devices) or otherwise in computers (e.g., internal hard drives or flash memories) which, as containing or embodying or utilizing such code corresponding to executable instructions, function in unique ways to achieve unique results by (or when) executing instructions corresponding to such code. Some non-limiting embodiments, moreover, may employ scanners or cameras as well as image display devices and the like.

In certain example embodiments, a method and/or system for modeling a 3D object by combining global and local modeling in a multi-resolution approach is provided. In one such example embodiment, a system and/or method is provided based on a Global-to-Local (G2L) model comprising modeling and coding a 3D surface of an object, using global and local components on different resolutions. For example, in such an embodiment, global features such as the overall head size and width may be modeled by low resolution components while the high resolution components model local features such as the shape of the nose or mouth. The high resolution components may be specifically organized in such a way that independent details of the face surface are modeled by separate components. The support of these components may be locally limited to the respective facial feature.

In such or other herein above or below disclosed embodiments, in contrast to PCA-based models, the G2L model 1) is flexible and can better represent novel objects or faces and can better adapt locally to partial information; 2) is more strict and only generates valid faces when forced to adapt locally; and/ or 3) has components with local support, which describe specific features of the face.

By way of non-limiting example, one principle of the global to local analysis is illustrated in the toy example in FIG. 2. In the first rows shown in the figure, a set of four shapes can be seen that is used as the training set. The training set suggests that the length of the triangle is independent from the size of the square. However, applying PCA to this set leads to two holistic principle components (the third component has a zero eigenvalue). With this model it is not possible to change the shape of the triangle without changing the position of the vertices of the square.

The G2L models local variation locally, but these local models are integrated into a single model that represents the whole face.

In certain embodiments, it is an object to have a model that can adapt to features locally. For example, the model can contain components with limited support, i.e., most of the components are nonzero only within a (small) region. The size of the support may depend on the kind of the feature. Features like the chin, the mouth and lips use components of different size. In such or other embodiments, besides the local components, the model has a few global components that control the size of the head and height-to-width ratio without affecting the shape of, e.g., the nose or the eyes.

In at least one embodiment, there is provided: a method of representing, modeling, or coding object properties of a 3-dimensional object by using global and local components of a plurality of resolutions to adjust a 3-dimensional model of a 3-dimensional object comprising the following method steps: breaking the objects properties into modes based on spatial frequency; segmenting high frequency modes into regional segments corresponding to specific features of the object properties; computing a Principal Component Analysis of the regional segments individually; combining a hierarchy of global and local components which are gradually decreasing in size of support into a linear statistical model; wherein, by performing the method, a global to local model of at least a portion of the 3-dimensional object is obtained.

In at least one additional non-limiting, example embodiment, in order to construct a model with global and local components (a G2L model), the following method may be used (alone or as part of a system comprised of hardware and software components):

Multiresolution analysis of the facial shape.
To break up the facial shape into components based on spatial frequency. The resulting hierarchy contains components gradually decreasing in spatial frequency.
Segmentation of the details.
The high frequency components code small facial features, that are clustered in multiple regions, each representing a specific feature. Therefore, these components can be segmented into regions in a meaningful way. For each level in the multiresolution hierarchy, different regions are used, the size of the regions depends on the spatial frequency. Hard edges at the boundaries of the segments may be avoided by the multiresolution approach.

Building a linear statistical model.

From the low frequency components and the segmented high frequency components, separate statistical models may be computed. The resulting global and local components can be combined into one linear statistical model. This statistical model can be used in the same way as PCA-based statistical models.

In certain alternative, but also non-limiting embodiments, there is/are provided (any method below being usable alone or in combination with one or more other methods):

a method based on (or utilizing) a plurality of examples of the object;

a method of generating a general 3D G2L face model to represent all kind of human faces comprising the steps of acquiring the data (scanning the faces), computing correspondence between the acquired scans and a reference template and computing the G2L model;

a method of computing a 3D surface model of a human face given a single photograph using the G2L face model;

a method of modifying the facial expression using the 3D surface model of a human face;

a method of computing animation using the 3D surface model of a human face; and/or a method to reconstruct the complete 3D shape of a face from missing data and partial information.

In still further alternative embodiments, a G2L model is built using a novel analysis method that breaks the objects up into modes based on frequency. The high-frequency modes are segmented into regions with respect to specific features in the object. After computing PCA on these segments individually, a hierarchy of global and local components gradually decreasing in size of their support is combined into a linear statistical model, hence the name, Global-to-Local model (G2L).

In at least on particular non-limiting example, the methodology can be used to build a novel G2L model of 3D shapes of human heads. In another non-limiting example, a G2L model is used to reconstruct the 3D shape of faces from a single photograph. In either or both examples, a novel adaptive fitting method estimates the model parameter using a multi-resolution approach. The model is first fitted to contours extracted from the image. In a second stage, the contours are kept fixed and the remaining flexibility of the model is fitted to the input image. This novel technique allows for the first time to integrate local optimization to a global optimum while maintaining all correlations properties.

In still further alternative embodiments, a G2L model can represent, model and code all kinds of faces, in particular novel faces and not only, like the morphable model, faces that are in the plurality of faces used to derive the model. In contrast to the morphable model, that is limited to global components, an exemplary (non-limiting, example) G2L model consists of global and local components on different resolutions. The G2L model is fitted to incomplete data, such as 2D images of the 3D object, or noisy or incomplete 3D data with a novel fitting method that separated the fitting problem into sub-problems that can be solved independently and interactively. Preferably first, it estimates the model parameter using a multi-resolution approach. The model is then fitted to contours extracted from the image. In an additional (e.g., subsequent) stage, the contours are kept fixed and the remaining flexibility of the model is fitted to the input image.

Although other uses or applications for the herein described methods and/or systems are contemplated and/or expected, certain non-limiting example uses/applications for the herein described technologies are: computer animation of objects (e.g., faces or avitars); static manipulation or modification of modeled images (e.g., faces); image processing; or facial (or other object) recognition methods and/or systems.

Certain non-limiting examples of the invention are now below described with respect to certain non-limiting embodiments thereof as illustrated in the following drawings.

DETAILED DESCRIPTION OF CERTAIN EMBODIMENTS

Figure 1:
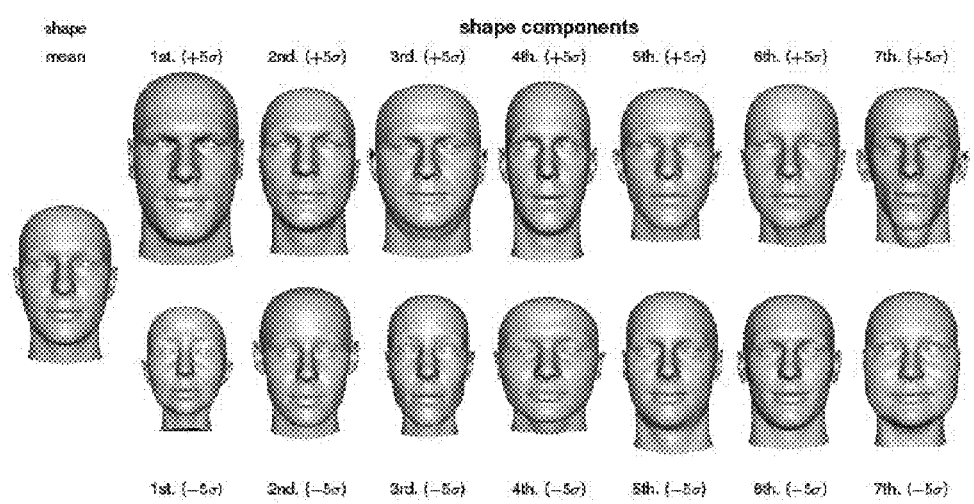
FIG. 1 illustrates holistic components of the PCA model.

For a more complete understanding of the present invention, reference is now made to the following description of various illustrative and non-limiting embodiments thereof, taken in conjunction with the accompanying drawings in which like reference numbers indicate like features.

As discussed in some detail above, in the context of face modeling and face recognition, statistical models have been widely used for the representation and modeling of surfaces. Prior to the instant invention, most of these models were obtained by computing Principal Components Analysis (PCA) on a set of representative examples. However, these models represent novel faces poorly due to their holistic nature (i.e. each component has global support), and they suffer from overfitting when used for generalization from partial information.

Addressing these (or other) deficiencies in the art, novel methods and/or systems for modeling (or transforming or processing or recognizing, etc.) 3D objects which solve one or more of these drawbacks or other problems or drawbacks or needs in the prior art are described herein. Generally speaking, such methods and/or systems (in certain example embodiments) address such deficiencies or needs by modeling a 3D object by combining global and local modeling in a multi-resolution approach.

In certain example embodiments of such methods and/or systems, an object (e.g., a face) is broken up into modes based on spatial frequency. The high-frequency modes are segmented into regions with respect to specific features in the object. After computing PCA on these segments individually, a hierarchy of global and local components gradually decreasing in size of their support is combined into a linear statistical model (hence the name, Global-to-Local model or "G2L").

Examples of these methodologies are explained herein in reference to building a novel G2L model of 3D shapes of human heads. Moreover, in the description contained herein, both the representation and the generalization capabilities of the models are evaluated and compared in a standardized test, and it is demonstrated that the G2L model performs better compared to traditional holistic PCA models. Furthermore, both models are used to reconstruct the 3D shape of faces from a single photograph. A novel adaptive fitting method is presented that estimates the model parameter using a multi-resolution approach. The model is first fitted to contours extracted from the image. In a second stage, the contours are kept fixed and the remaining flexibility of the model is fitted to the input image. This makes the method fast (30 sec on a standard PC), efficient, and accurate.

Turning now to one specific (but non-limiting example) embodiment of a method according to the invention (which may, optionally, be implemented in a system having hardware components), in order to construct a model with global and local components (a G2L model), the following method steps may be used (alone or combined with other methods or as part of a system comprised of hardware and software components):

Multiresolution analysis of the facial shape.
To break up the facial shape into components based on spatial frequency. The resulting hierarchy contains components gradually decreasing in spatial frequency.
Segmentation of the details.
The high frequency components code small facial features, that are clustered in multiple regions, each representing a specific feature. Therefore, these components can be segmented into regions in a meaningful way. For each level in the multiresolution hierarchy, different regions are used, the size of the regions depends on the spatial frequency. Hard edges at the boundaries of the segments may be avoided by the multiresolution approach.

Building a linear statistical model.
From the low frequency components and the segmented high frequency components, separate statistical models may be computed. The resulting global and local components can be combined into one linear statistical model. This statistical model can be used in the same way as PCA-based statistical models.

Multiresolution Analysis

In order to develop the multiresolution scheme of the G2L models, we use a concept from image processing to decorrelate image pixels, the Gaussian- and Laplacian Pyramids. This principle is transferred to 3D shapes. For the G2L model, it is used to split up the facial shape and later recombine it without artifacts at the boundaries.

Gaussian- and Laplacian Pyramids for Shapes

The concept of Gaussian- and Laplacian Pyramids is defined for 2D images and we now transfer this concept to 3D shapes. As with images, the Gaussian shape pyramid is created by repeatedly applying a low-pass filter and subsampling. The Laplacian shape pyramid is defined as the difference between consecutive levels of the Gaussian pyramid. Thus we need to define two transitions: a fine-to-coarse transition that smooths and subsamples the mesh and a coarse-to-fine transition that takes a low resolution mesh and computed and interpolated (or rather approximated) copy of the mesh.

Coarse-To-Fine Transition

For the coarse-to-fine transition we use Catmull-Clark subdivision, an approximating subdivision scheme that creates smooth surfaces. To interpolate low resolution images, usually bilinear interpolation is used. This interpolation method can also be used for shapes. However, bilinear interpolation applied to shapes leads to hard edges that look unnatural for smooth objects like human faces. Another possibility to interpolate the surface would be to use an interpolating subdivision scheme, like Modified Butterfly Subdivision. Interpolating subdivision schemes do not change the position of a vertex, once a vertex exists in the mesh. Common for all interpolating subdivision schemes is that they may generate strange shapes with unnatural undulations. To avoid these artifacts, we prefer an approximating subdivision scheme that creates smooth surfaces without unnatural undulations. Approximating subdivision schemes may change the position of a vertex that already exists in the mesh. Here we use one of the most popular subdivision schemes, the Catmull-Clark subdivision scheme for meshes with quadrilateral faces. It is based on tensor product bi-cubic uniform B-splines. The limit surface obtained by repeated subdivision is called Catmull-Clark surface.

Fine-To-Coarse Transition

Beside the coarse-to-fine transition, we need to define a fine-to-coarse transition. The downsampled version of the mesh is generated from the high resolution mesh on level h. This utilizes three steps:

To avoid aliasing effects, the data is low-pass filtered by Gaussian smoothing. For meshes it is more appropriate to smooth the direction and the length of the vectors. When smoothing is applied to the x-, y- and z-coordinates of the vertices independently, the mesh tends to shrink. This effect is undesired, the surface should be a coarse approximation and not a smaller version.

Downsampling is performed using the regular structure of the mesh by removing every second vertex in parametrization. This is done in both the x and y directions of the parametrization, and as a result the mesh on level 1 has approximately ¼ of the vertices of the mesh on level 1.

Figure 2:
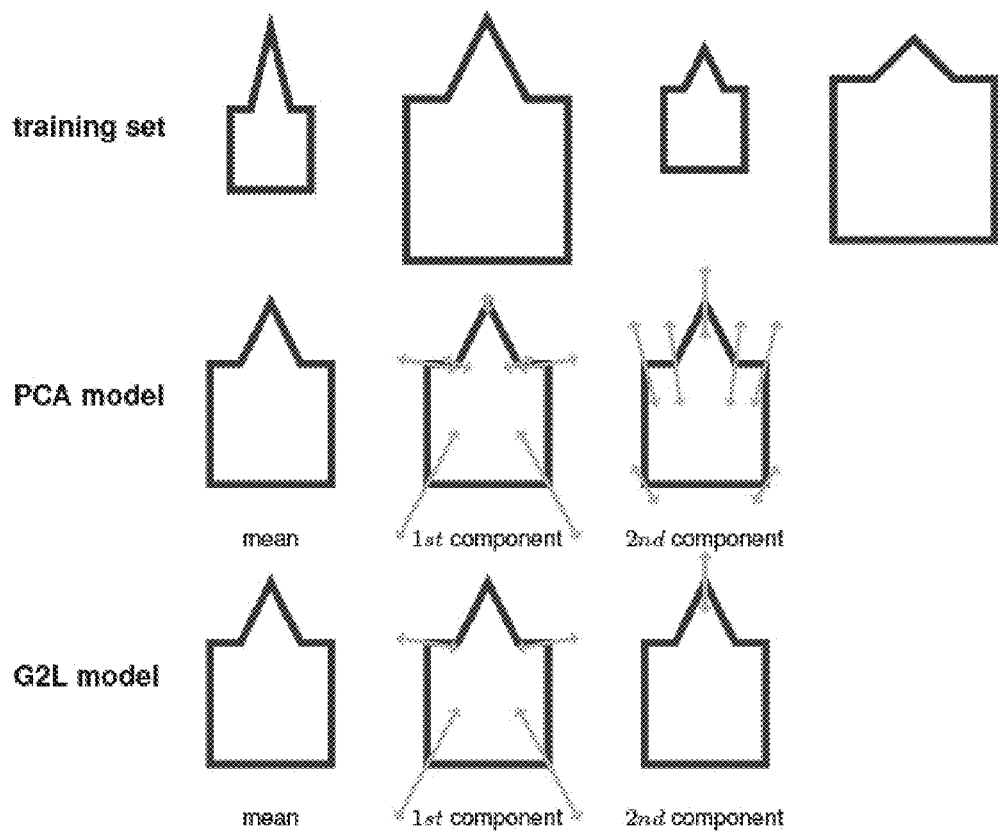
FIG. 2 illustrates a toy example in which a training set (the four shapes in the 1st row), a PCA model (2nd row), and a G2L model (3rd row) are trained. The PCA model has two holistic components. The G2L model has one global component that affects the size of the square and one local component that modifies only the triangle (the nose). Although this is a toy example, the PCA and G2L models are in fact computed from the 2D vertex positions of the training set.

The volume of an object usually changes by Catmull-Clark subdivision. As a result, when applying the subdivision scheme to the downsampled mesh, the result is a downsized version of the face. The vertices of the low resolution mesh are control points that affect the shape and size of the Catmull-Clark surface. Hence, we want to find those control points that generate a mesh that is a coarse approximation of the input mesh while maintaining overall size. Hence, the low-resolution mesh is not a coarse approximation of the input mesh, but they are the control points for Catmull-Clark subdivision. To find these control points, it is necessary to invert the subdivision matrix. Inverting the subdivision matrix is an overconstrained problem, so this can only be approximated. The resulting hierarchy of meshes, together with the resulting limit surfaces can be seen in FIG. 2.

Filterbank

Figure 3:
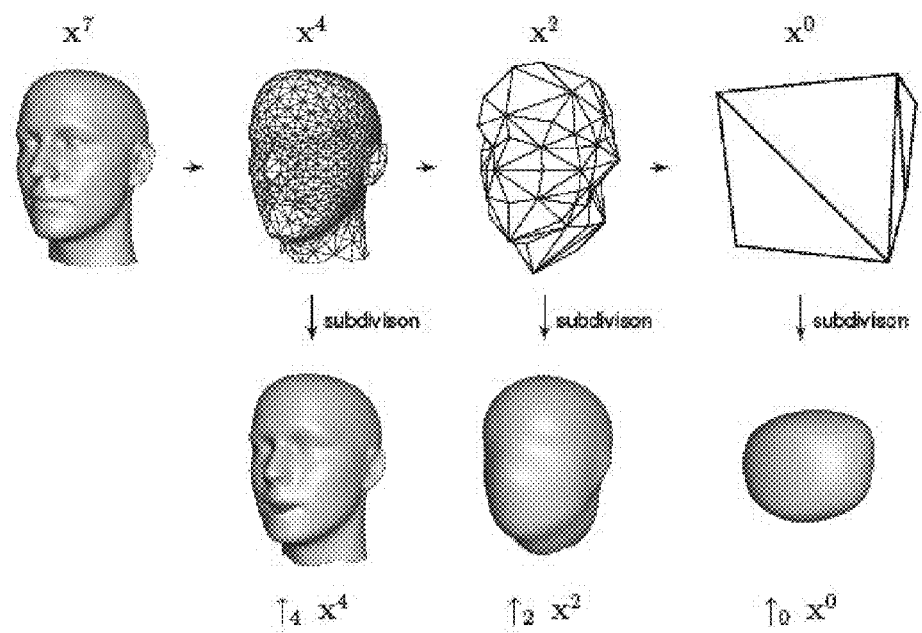
FIG. 3 illustrates an example in which a Gaussian Pyramid for 3D shapes (shown in the first row) is computed by repeatedly applying a Gauss Filter and subsampling. Also shown in this figure are Catmull-Clark surfaces that are generated by the low resolution meshes.

The low level mesh contains fewer vertices than the high level mesh, so some details are lost. These details are captured by the residual between the low and high level mesh. Analogously to the Laplacian Pyramid for images, the original mesh xh can be recovered given the low resolution mesh xl and the details. This process can be continued recursively. For the G2L model, a filterbank with the four steps is used (see FIG. 3). This is a reasonable trade-off and having a model with too many levels is not helpful for the statistical analysis. By collapsing the pyramid (i.e. recombining all pyramid levels of the Laplacian pyramid), the original data is reconstructed. Turning a surface into this kind of Laplacian Pyramid and collapsing is a lossless transformation.

Segmentation of the Details

Figure 4:
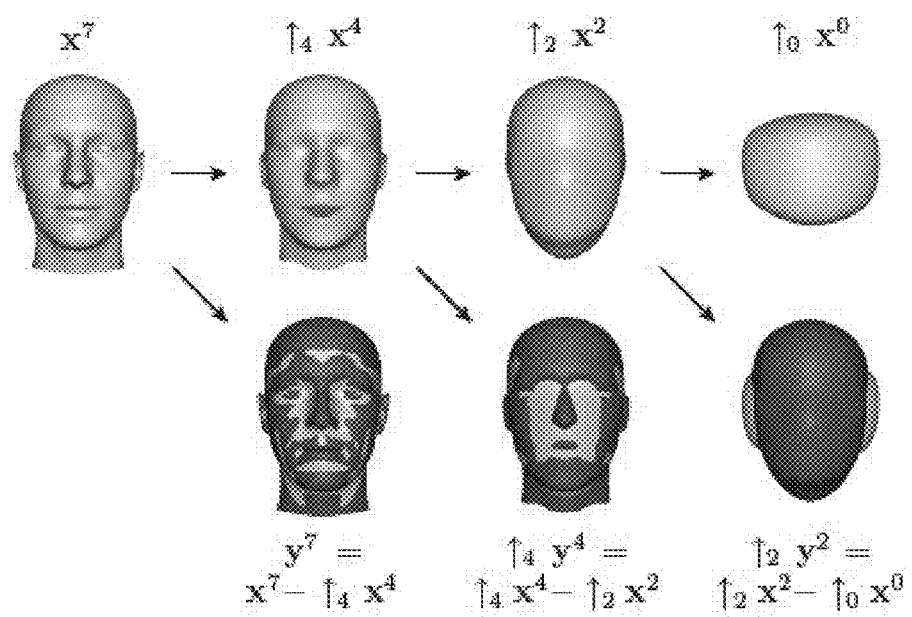
FIG. 4 illustrates an example in which a Laplacian Pyramid for shapes is computed using the Gaussian Pyramid. This defines a filterbank of 3D shapes. The details in the second row are the offset between the red and the white surfaces (shaded surfaces in black and white drawings).
Figure 5:
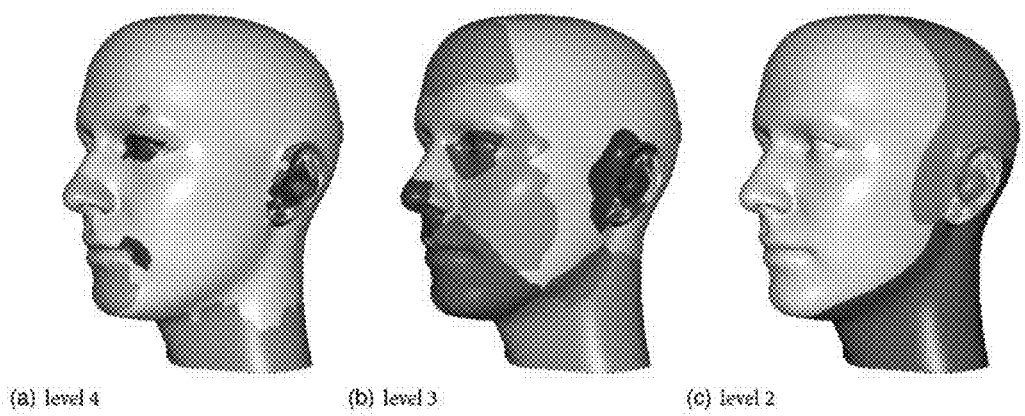
FIG. 5 illustrates an example in which, to segment the high frequency details, different masks are used for the different levels. The segments are defined taking into account the variance.

By the multiresolution analysis with the Laplacian Pyramid, the facial surface is broken up into components according to spatial frequency. But the detail components do not have a local support yet. They influence the whole face and not a specific feature. However, as with images, the Laplacian Pyramid removes correlation and these details are sparse: we observe that they cluster into regions. The reason for this is that in some regions (e.g. at the cheeks), there are usually no high frequency details. To achieve local support, the details are segmented into regions of facial features, such that the details in each segment are correlated with details in the same segment, but not (or as little as possible) with details in other segments. The segmentation considers the variance, i.e. the boundaries of the segments go through regions with small variance. In this way, components with local support are created, which independently model separate facial features. For each level, a different segmentation is used, and the size of the segments is related to the spatial frequency of the features, see FIG. 4. For the G2L model, it is necessary to recombine the segments to a single shape, i.e. we meet the problem of blending different regions of the shape. To avoid hard edges at the boundary of the segments, blending of the segments is done using the Laplacian pyramids of shapes, in a similar way as the Laplacian Pyramids are used to blend multiple images [Burt83]. The segments are blended across a transition zone proportional in size to the spatial frequency of the facial features represented in the segment. At the top level of the pyramid, a sharp blend mask is used, while at the bottom level a wide one is used. Thus, high frequency details are blended over a narrow region and low frequency details are blended over a wide region. To segment the detail components, binary masks are used. The segment components are given by masking the detail components and subdividing up to the maximal level. All segment components are represented by vectors of the same length as the original mesh. However, the segments have local support. By using the masks on a low resolution and subdividing the masked segments, the boundaries are smoothed with a transition zone that depends on the level. By summing up all segments, the detail components can be recovered.

Building a Linear Statistical Model

Figure 6:
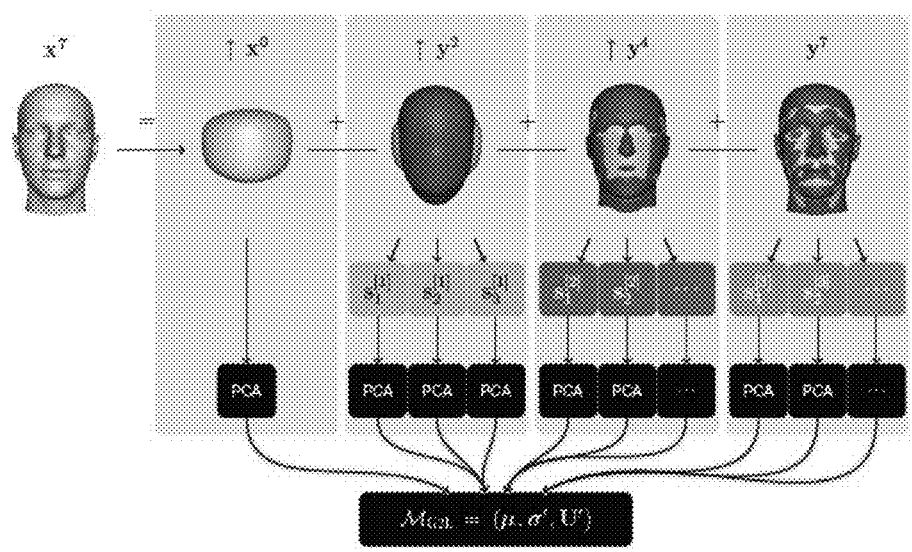
FIG. 6 illustrates an example set of steps used to build the G2L model. In this example, the facial surface is broken up according to spatial frequency by multiresolution analysis. The high frequency details are segmented. For the global and local segments, individual PCA models are computed and the components are combined into a linear statistical model.

The facial surface of a single face is broken up into features with local support. This can be done for all faces in the database. In the following, we describe how the global and local features are used to define the local and global components of a linear statistical model. In FIG. 6 this process is visualized.

Global and Local Components

With the Gaussian pyramid of shapes, the facial surface is split into a hierarchy of low-frequency features and high-frequency features.

$$x = \uparrow_o x^0 + \sum_l \uparrow_l y^l$$

The high-frequency features are segmented into multiple regions, i.e. each face is split into global features and a set of local features.

$$x = \uparrow_o x^0 + \sum_l \sum_{m \in M^l} s_m.$$

The segments are all represented by vectors of the same length. These global and local features are combined to a feature vector $$x' := \begin{pmatrix} s^0 \\ s^1 \\ \vdots \\ s^{\tau-1} \end{pmatrix} \in R^{3m\tau}$$

where $$s^0 := 1_0 x_0 \in R^{3m}$$

are the global features and $$s^j := s_m \in R^{3m} j > 0$$

are the local features.

The mean-free feature vectors of the training set are stacked into the data matrix $$X' := [x'_1 - \mu', \ldots, x'_n - \mu'] = \begin{pmatrix} X^0 \\ X^2 \\ \vdots \\ X^{\tau-1} \end{pmatrix}$$

Covariance

The features are constructed in such a way that the covariance matrix exhibits a specific sparsity pattern: high resolution components are decorrelated from low resolution components and independent facial features within each resolution level are decorrelated from each other. To estimate the covariance matrix, we assume or rather enforce complete decorrelation. These assumptions are reasonable for the face model. For the PCA model, the covariance matrix is diagonalized. In term of the global and local features, the covariance matrix can be written as $$\Sigma = \frac{1}{n}XX^T = \frac{1}{n}BX'X'^T B^T$$

To diagonalize the matrix, however, we can make use of the sparsity and approximate the matrix by $$X'X'^T \approx \frac{1}{n}\begin{bmatrix} X^0 X^{0^T} & & & \\ & X^1 X^{1^T} & & \\ & & \ddots & \\ & & & X^\tau X^{\tau^T} \end{bmatrix} =: \Sigma'.$$

Even if the high and low resolution components are not completely decorrelated in the original data, we assume or rather enforce complete decorrelation by using above approximation. Therefore, the SVD is computed individually on each block of local components.

$$X^j = U^j W^j V^{j^T} \text{ and } \Lambda^j = \frac{1}{n}W^{j^2}$$

$$\Sigma' = \begin{bmatrix} U^0 \Lambda^0 U^{0^T} & & & \\ & U^1 \Lambda^1 U^{1^T} & & \\ & & \ddots & \\ & & & U^\tau \Lambda^\tau U^{\tau^T} \end{bmatrix}$$

$$= \begin{bmatrix} U^0 & & \\ & \ddots & \\ & & U^\tau \end{bmatrix}\begin{bmatrix} \Lambda^0 & & \\ & \ddots & \\ & & \Lambda^\tau \end{bmatrix}\begin{bmatrix} U^0 & & \\ & \ddots & \\ & & U^\tau \end{bmatrix}^T.$$

Hence, the covariance matrix is approximately diagonalized by $$\Sigma = BX'X'^T B^T$$
$$\approx [U^0, U^1, \ldots, U^\tau]\Lambda'[U^0, U^1, \ldots, U^\tau]^T$$
$$= U'\Lambda' U'^T$$

where $$U' := [U^0, U^1, \ldots, U^\tau]$$

is the combined matrix of all components.

$$\Lambda' = \mathrm{diag}(\Lambda^0, \Lambda^1, \ldots, \Lambda^\tau)$$

is the diagonal matrix of all eigenvalues. The difference to the estimation of the covariance for the PCA model is that most of the components here have local support, since they are computed from segments sm with local support.
PCA minimizes the projection error of the samples to a lower dimensional subspace, i.e. it minimizes the deformation introduced by using a restricted number of components. For this reason, for PCA models, the number of components can be reduced by using the principle components with the largest eigenvalues, which by convention are the first components. For the G2L model, we use a similar approach. For each component, the corresponding value of deformation measure is given by corresponding eigenvalue. Hence, we use the component with the largest eigenvalue over all global and local components. Together with the mean, the component matrix and the corresponding standard deviation define a linear generative statistical face model.

$$M_{G2l} = (\mu, \sigma', U')$$

Fitting

The most important application of statistical shape models is their use as prior knowledge in the reconstruction of the 3D shape of a face. For example, as input data for reconstruction, noisy and/or incomplete 3D data can be used. The much more difficult scenario is given when no 3D data is available and the model parameters have to be estimated from a 2D projection of the face. In contrast to purely descriptive models, the parameters can not only be used as an abstract description of the face, but also to reconstruct the 3D shape. Here we describe a method to estimate the model parameters. As input we use a single photograph of the subject, together with a few (typically five to seven) manually labeled feature points. Fitting is done by estimating the model parameters with an iterative approach, using an Analysis-by-Synthesis loop: the 3D model is rendered as an image and this image is compared with the input image. The parameters are updated to minimize the residual. Fitting the model to an image requires three components: a statistical model, a cost function and an optimization algorithm.

Statistical Model

To render the image, additionally to the statistical shape model, a camera model is used that describes the pose of the face, its 3D position in the world space and the internal parameters of the camera. Analogously, in addition to the statistical surface color model, a simple global illumination model is used. While the shape and color models have already been introduced, in this section we derive the external models (i.e. the camera and the illumination model).

Cost Function

To model the optimization problem, a cost function (also called objective function) is needed. In the Analysis-by-Synthesis loop, the cost function compares the input image with a rendered image. The most commonly used cost function is the 12-distance between the generated image and the input image. However, this type of cost functions has many local minima. For this reason, instead of using one single cost function, we use different cost functions measuring the distance of landmark points, contours and pixel intensities.

Optimization Algorithm

To minimize the cost function, we use a variant of the Quasi-Newton algorithm (L-BFGS).

External Models

Figure 7:
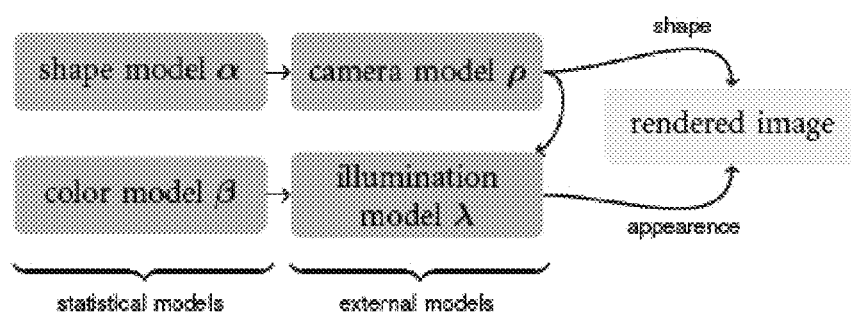
FIG. 7 illustrates an example in which, to render the images in an analysis-by-synthesis loop, the camera and the shape model define the 2D shape of the face in the image and the illumination model and the color model define the appearance.

The fitting system uses an analysis-by-synthesis approach: it minimizes the difference between the input image and the reconstructed scene. To render the image, in addition to the shape and color model, two external models (camera and illumination) are needed. The shape model (parameter) gives the 3D position of each vertex in 3D. The camera model (parameter) projects the vertices to 2D positions in the image. The relation of surface color model and illumination model is analogous, see FIG. 7. The color model (parameter) defines inherent color of the surface. Since we are using per-vertex color, there is one RGB color per vertex. The illumination model (parameter) simulates the light source and estimates the final appearance or pixel color in the image. While doing so, the estimated normals of the shape are used. Usually, one is not interested in the external parameters, but mostly in the model parameters. These parameters describe the shape and color or albedo of
the face and can be used to reconstruct the face. The parameters can also be used directly for recognition. The external parameters that describe pose, 3D position, internal camera parameter, and illumination conditions are most often not of direct interest.

Shape and Color Model

The shape model is a statistical model that defines the 3D position of each vertex in model coordinates (i.e. in the model coordinate frame). Analogously, the color model is a statistical model that is trained with the corresponding per-vertex color. Here, we solely use a PCA-based color model. The color model defines the color of each vertex.

Camera Model

As camera model, a pinhole camera model is used. A general pinhole camera has nine degrees of freedom [Hart04]: three internal camera parameters (focal length and principle point) and six external camera parameters that describe the rotation (three parameters) and 3D translation (three parameters) between the model coordinate (or object coordinate) system and the camera or eye coordinate system. We use a 9-parameter pinhole camera model.

Illumination Model

We now have the 2D position for each vertex in the image. In principle, we could render a 2D image using the corresponding color value from the model (We omit rasterization here, since we do not need it for the definition of the cost function, i.e. we only render the vertices without rastering the triangles between the vertices. Rasterization is only needed for z-buffering, i.e. to determine which vertices are visible.)

The result would be an image showing the pure albedo without any shading. To compute the pixel intensities for a shaded surface, we need a (local) illumination model. The illumination model uses light which comes directly from only one light source (direct illumination), i.e. we do not consider reflected light (like from the walls) and effects like cast shadows. To model the reflection, we use the Phong reflection model, an empirical model of local illumination. This is an adequately simple illumination model and is very often used, in particular it is the default illumination model used in OpenGL. The color of the reflected light is computed independently for the three color channels. The inherent color (albedo) of the surface a comes from the color model. The color contrast is corrected and each color channel is multiplied by the color gain and an offset is added.

Cost Function

In each iteration of the analysis-by-synthesis loop, the cost function is given as the difference between the input image and the rendered image. The naive way of computing the difference is the sum over all pixels of the image. Defining the cost function as a sum over vertices (instead of a sum over pixels) has the advantage that it is not necessary to render the full image, i.e. to rasterize the triangles of the projected model mesh. This assumes regularly distributed vertices, otherwise a weighting would be needed. Avoiding rasterization in the definition of cost function makes computing its derivatives much easier. The cost per vertex compares the calculated color of the vertex with the color from the input image (i.e. the color from the input image at that position onto which vertex i is projected). The intensity cost function is given by the squared difference between the RGB intensities of input image eI and the RGB intensities of the rendered model. The sum runs over some (not necessarily all) vertices. For different cost functions, the sum can run over a different set of vertices, e.g. the sum runs over all vertices that are visible in the input image, or just the vertices at the contour. For the intensity cost function, the sum runs over all visible vertices, i.e. over all vertices that are neither occluded by other parts of the face nor at the back of the face.

Special Cost Functions

When fitting the model to the image, we which to find the optimal model and camera parameters by minimizing the difference between the rendered model and the input image. The cost function measures this distance between image and model. It should be neither too complicated nor too simple. When the cost function is too simple, the resulting parameters are only a poor approximation. When the cost function is too complicated, the optimizer is not able to find the global minimum. An optimal cost function is minimal at the best fit p and has no other (local) minima. This allows us to use gradient based optimization algorithms which work best on well behaved functions. In this way, we achieve fast and accurate optimization. Cost functions with many local minima require the use of robust optimization algorithms (e.g. stochastic optimization) that require many evaluations of the cost function (and possibly the gradient) and are therefore very slow.

In our fitting system, we use several types of cost functions. The intensity cost function has many local minima. We wish to formulate our fitting algorithm in terms of such a ideal cost function.

To compute this cost function, additional features such as edges or landmark points are extracted from the image and the cost function is given as the distance to the nearest feature. Recently, approaches to learn locally ideal cost functions for face model fitting have been proposed [Wimm08]. The advantage of their approach is that the potentially difficult process of extracting edges from the image is avoided. These cost functions used to determine the camera parameters and shape parameters have the form of a general least squares cost function that only depends on the 2D position onto which the vertex has been projected. In the fitting system, we use two such cost functions:

Landmark Cost Function

In this case, the sum runs over a set of predefined landmarks and denotes the 2D position of landmark i.

Contour Cost Function

In this case, the sum runs over all vertices on the contour.

Regularization

Not every possible parameter vector represents a valid face. With statistical models, it is assumed that the model parameters and are distributed according to a specific distribution, in our case a normal distribution. The different cost functions measure the difference between the input image and the rendered image (defined by the parameters) in different ways, without considering the likelihood of the parameters. As a result, minimizing these cost functions sometimes leads to very unlikely faces. For the cost function, this means that not only the difference has to be minimized, but we also have to assure that the parameters are distributed properly. The assumption that the parameters are distributed according to a normal distribution lead to the regularization term.

Stepwise Fitting System

Figure 8:
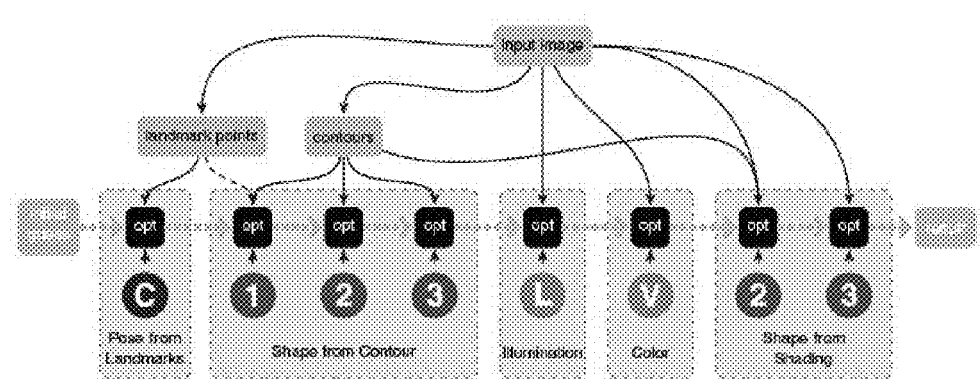
FIG. 8 illustrates an example in which the fitting system consists of several modules that run consecutively. Each module updates the parameter of the corresponding model and gives the parameter to the next modules as an initial guess. Model C is the camera model, 1, 2, 3 are the global and the local components of the G2L model, L is the illumination model, and V is the per-vertex surface color model.

The fitting system fits the parameters step by step to the input image. For this purpose, several modules are used that run consecutively. In FIG. 8 the fitting system is illustrated. In the following, we give an overview of the fitting system.

Algorithm 1: Fitting Algorithm

Data: Input image I
2  Estimate camera model parameters ρ:

$$\rho = \operatorname*{argmin}_{\rho} F^{lm} = \operatorname*{argmin}_{\rho} = \sum_{i \in S^{lm}} \left\| P_\rho(\vec{x}_i(0)) - \vec{l}_i \right\|^2$$

for level l = {1, 2, 3} do
4  Distance Transform d(x, y) = distTrans(I, l).
5  Estimate shape model parameters α on level l:

$$\alpha_l = \operatorname*{argmin}_{\alpha_l} F^{cnt} = \operatorname*{argmin}_{\alpha_l} \sum_{i \in S^{cnt}} d(P_\rho(\vec{x}_i(\alpha)))^2$$

where $S^{cnt}$ are the vertices on the contour 6  for illumination and surface color model $\xi \in \{\lambda, B\}$ do 8  Estimate model parameters $\xi = \operatorname*{argmin}_\xi F^{int}$ $$\operatorname*{argmin}_{\xi} \sum_{i \in S^{vis}} \left\| I(P_\rho(\vec{x}_i(\alpha))) - I_\lambda(\vec{\alpha}(\beta))_i \right\|^2$$

10  Fix vertices at the contour and refine shape parameter:
11  level l = 2: $\alpha_2 = \operatorname*{argmin}_{\alpha_l} F^{int} + F^{cnt}$
13  level l = 3: $\alpha_3 = \operatorname*{argmin}_{\alpha_l} F^{int} + F^{reg}$ Multiresolution The application of fast optimization methods requires the cost functions to be well behaved, i.e. they should be locally, smooth and should not have too many local minima. In the fitting system we use several cost functions. In particular, the intensity cost function has many local minima, but so does the contour cost function, when the contours or edges are extracted from an image with an overly sensitive edge detector. For this reason we combine the approach of using several cost functions with a traditional multi-resolution approach for the cost functions. In most cases, this procedure also significantly speeds up the optimization.

Multi-Level Fitting

Figure 12:
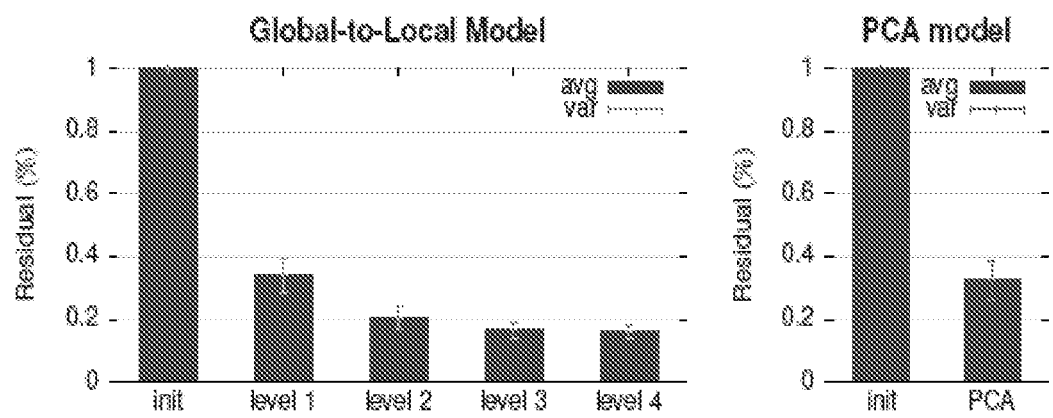
FIG. 12 illustrates the evaluation of the contour fitting in a synthetic test environment where the input images are computed from the 3D geometry of the faces in the test set (Un-iBS-A test, 10 images per subject with varying pose and illumination). Since the numerical value of the cost function differs depending on the size of the head and the pose (number of vertices at the contour is different), the error is normalized with the error after the pose from landmark step that is used as initial guess for the contour fitting. The left plot shows the error for the G2L model after fitting level 1, 2, 3 and 4.

This principle is now used for the fitting. The cost function is evaluated from two inputs, the input image (eI) and the image generated by the model (I). The input image is smoothed and downsampled, and the image gradients are computed from the downsampled images. Accordingly, in case of the contour cost function, the edges are extracted on downsampled images and different parameters for the edge detector are used, such that more or less detailed edges are used for the fitting. For the model term, however, we make use of the multi-level structure of the G2L model and three levels of the G2L model are fitted one after the other. At first, the global shape model (level 1) is fitted to a low resolution version of the image, then the local components on level 2 are fitted to the higher resolution image, and finally the local components on level 3 are fitted to the original image. Usually, the very fine details on level 4 are neglected, since experiments have demonstrated (e.g. see the experiment shown below) that these components are not relevant for the fitting (FIG. 12).

2-Stage Fitting

In addition to the multi-level fitting, the optimization problem is separated into two sub-problems.

Stage 1

The position of landmarks and contours in an image do not depend on the illumination of the scene. For this reason, these features can be extracted without having estimated the illumination. These features are then used to estimate the camera and shape coefficients. Therefore, in the first stage of the fitting, we can fit the camera and the shape coefficients, while the illumination and color model parameters are neither estimated in the first stage, nor even needed for the landmark cost function and the contour cost function. The result is an approximation of the surface that matches these features very well, but lacks some of the internal features of the face. For example, for faces in frontal view the shape of the nose is only poorly reconstructed up to now.

Stage 2

The estimated shape from Stage 1 is accurate enough to fit the illumination model and then the color model. Then, the estimated shape is used as an initial guess for the intensity cost function to refine the shape parameter of the local models on level 2 and 3. The local components on level 3 have a smaller support than the components on level 2, and in fact, many components do not touch the contour. For this reason, here a different approach can be used that directly exploits the local support of the components. The local components that are intersected by the outer contour (i.e. by the silhouette) are called outer components and the other components are called inner components. The partition in outer in inner components is computed based on the current fitting after having fitted on level 2. The outer components are already determined by the contour and need no refinement. The inner components are not determined, except those that are already fitted to the texture contours and the self-occlusion contours. On the other hand, changing these components does not influence the area in which the cost function is computed and there the problems discussed above do not appear. The outer components are fixed and inner components estimated. The effect of this step is usually clearly visible in the shape. The shape of nose, lips and eyes changes considerably, since these features are not sufficiently determined by the contour used in the early fitting stages.

Efficiency

With the focus on accuracy, time efficiency was not out primary goal. On the other hand, the long run time of previous fitting methods was not only one of the main reasons that hindered the widespread application of these models, it also hinders the development, testing, and evaluation of the fitting system. Computing a full fitting takes ca. 30 s on recent consumer hardware. This is much faster compared to all previous fitting algorithms. In [Romd05] a run time of ca. 70 s computer was reported for the MMF/LM fitting and ca. 4.5 min on a 2.0 Ghz for the SNO algorithm. The run time of the optimization is given by the number of function evaluations and the cost per iteration. The internal cost of the optimizer can be neglected (at least for L-BFGS). In order to develop an efficient fitting implementation, one has to choose an optimizer that requires few functions and gradient evaluations and to implement the evaluations efficiently. Strategies for achieving these efficiency goals are discussed in the following sub-sections. By using the multiresolution approach (with multiple levels of the statistical model and multiple modules), the cost function in the first modules is smooth, and in the last modules we start with a quite good initial guess. Therefore, it is not necessary to use stochastic optimization algorithms, that are robust but slow. Instead, we can use very efficient optimization algorithms that require only a few evaluations of the function and the gradient, but have the disadvantage that they are sensitive to local minima in the cost function. With the multiple modules strategy, not all parameters of all models are optimized at the same time and therefore not all gradients are needed all the time.

Accordingly, only the gradients with respect to parameters that are not fixed are evaluated. The computational cost for evaluating the gradients differs dramatically for the different cost functions used. Especially the derivatives of the intensity cost function are much more expensive than the derivatives of the other cost functions.

On the other hand, the runtime of the fitting can be reduced by reducing the runtime per iteration. The cost of the function evaluation is mainly given by the cost of computing the linear combination of the model (see Equation 5.1 below) and rendering the image.

$$\vec{x}_i(\alpha) = \vec{\mu}_i + U_i \text{diag}(\sigma_1 \ldots \sigma_n)\alpha \qquad (5.1)$$

The linear combination is efficiently computed using BLAS Level 2 (matrix-vector operations), and OpenGL could be used to compute the image. However, for all cost functions used, we need the 2D positions of the vertices in the image, not only the pixel intensities that can be read from the OpenGL framebuffer. For this reason, we compute the 2D positions (i.e. 4×4-matrix 4-vector) using BLAS. OpenGL, however, is used for determining which vertices are visible and which are occluded by other parts of the object. This is done by using the OpenGL z-buffer. Thus, we avoid rasterization of the triangles on the CPU.

Results and Comparison

It is quite difficult to evaluate the quality of a fitting result. This was the motivation for the evaluation in a controlled environment. Nevertheless, fitting results should be evaluated, even if this evaluation is done visually. The same two points need to be considered: Firstly, how well are the features of the face in the image matched? This is important in particular for the contours, but also for other features where the estimated shape and the input need to be in correspondence. This can be evaluated by extracting the texture and rotating the face into a novel view. Secondly, how well is generalization, i.e. how similar are the estimated shape and true 3D real shape of the person? To compare fittings of the G2L model with the PCA model, it would be easy to use the fitter presented here with a PCA model. However, this comparison is unfair, since the fitter is not tuned to PCA models. In particular, due to the missing multiresolution of the PCA model, the fitter almost immediately gets stuck in a local minimum. For this reason, it is more meaningful to use the fitter from [Romd05] as a reference system, which is optimized to the BFM PCA model.

Figure 9:
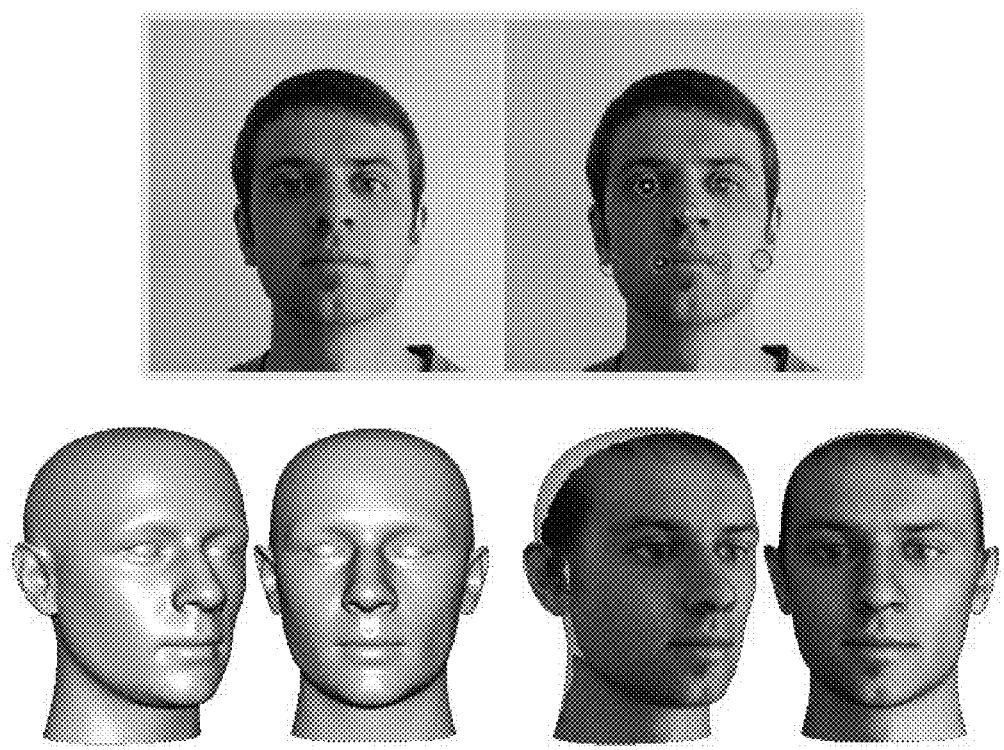
FIG. 9 illustrates a first example result.
Figure 10:
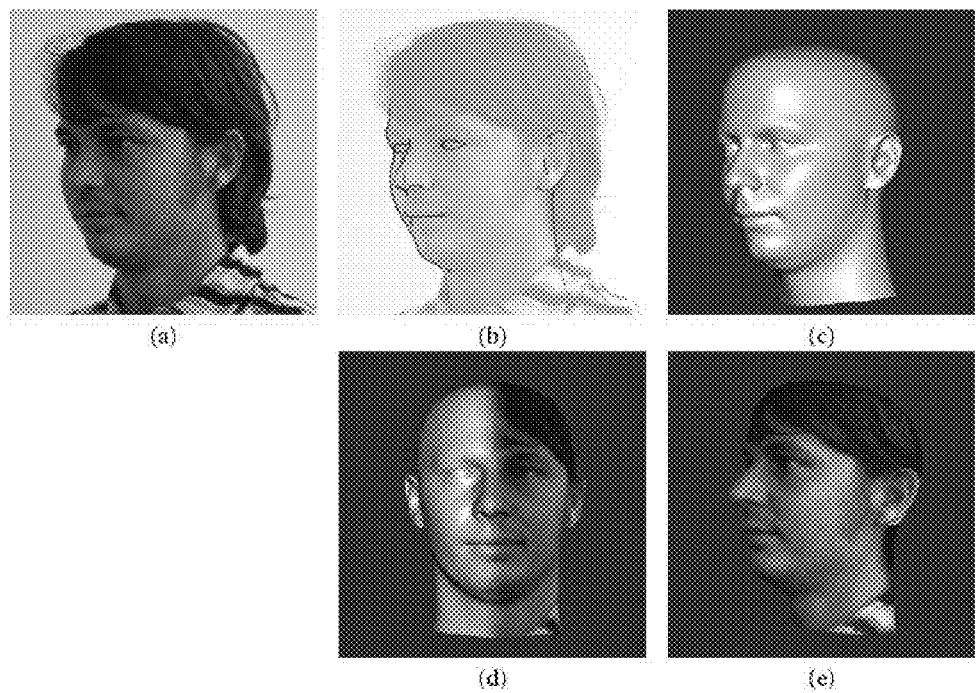
FIG. 10 illustrates a second example result.
Figure 11:
FIG. 11 illustrates a third example result.
Figure 11:
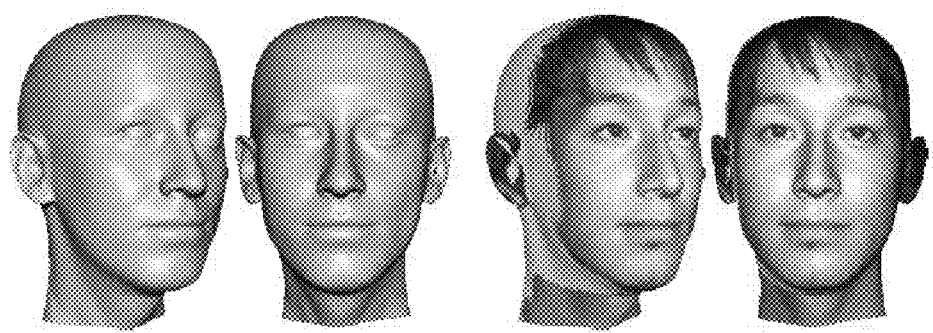

In this experiment the model is fitted to photos of subjects from the test set. 3D scans of these subjects are available and hence we can compare the estimated surfaces with the captured surfaces. The G2L model is trained from the training set, but the subjects of the test set are not in the training set. In FIG. 9 and FIG. 10 and FIG. 11, example fits are shown. The surfaces with extracted textures rendered in a novel view confirms that the features are matched accurately. Comparing the estimated surface with the captured surface of these subjects shows that the surface is estimated well.

In the detailed description provided herein, a novel analysis method for training a statistical model from data has been presented (e.g., for use alone, with other methods, or in conjunction with hardware based systems). The components of the well-known PCA model all have global support, i.e. each model coefficient affects the full shape. The G2L model is based on a multiresolution analysis of the shape and consists of a hierarchy of global and local components with limited support. The shape of different parts of the face can be modified without affecting the rest of the shape.

In order to evaluate the quality of the model, a controlled fitting environment, where the surface of faces is reconstructed from a sparse set of 3D landmark points was used. It has herein been demonstrated that, in contrast to the PCA model, the G2L model is able to locally adapt to the landmarks. At the same time, the G2L model has a slightly better generalization error than the PCA model. It has also been herein demonstrated that this model can be fitted to a single photograph and can reconstruct the 3D surface of a face. In the fitting system, first the contours are fitted. In a second step, the contours are kept fixed, and the remaining flexibility of the shape model is fitted using the color pixel intensities. A multiresolution approach for fitting is used, that in combination with an efficient Quasi-Newton method (L-BFGS) results in a run-time for the full fitting of 30 s on standard hardware. The G2L model has decisive advantages compared to the previous PCA model, in particular the model is locally more flexible and can therefore match features in the image much more accurately.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined.

LIST OF REFERENCES

[Blanz99] V. Blanz and T. Vetter, "A morphable model for the synthesis of 3D faces," in *SIGGRAPH '99: Proceedings of the 26th annual conference on Computer graphics and interactive techniques*. New York, N.Y., USA: ACM Press/Addison-Wesley Publishing Co., 1999, pp. 187-194.

[Romd05] S. Romdhani and T. Vetter, "Estimating 3D shape and texture using pixel intensity, edges, specular highlights, texture constraints and a prior," *Computer Vision and Pattern Recognition, 2005. CVPR 2005. IEEE Computer Society Conference on*, vol. 2, pp. 986-993 vol. 2, June 2005.

[Blanz03] V. Blanz and T. Vetter, "Face recognition based on fitting a 3D morphable model," *Pattern Analysis and Machine Intelligence, IEEE Transactions on*, vol. 25, no. 9, pp. 1063-1074, 2003.

[Turk91] M. A. Turk and A. P. Pentland, "Face recognition using eigenfaces," *Computer Vision and Pattern Recognition, 1991. Proceedings CVPR '91., IEEE Computer Society Conference on*, pp. 586-591, June 1991.

[Coop95] D. Cooper, T. Cootes, C. Taylor, and J. Graham, "Active shape models—their training and application," *Computer Vision and Image Understanding*, no. 61, pp. 38-59, 1995.

[Blanz02] V. Blanz and T. Vetter, "Reconstructing the complete 3D shape of faces from partial information," *it+ti Oldenburg Verlag*, vol. 44, no. 6, pp. 295-302, 2002.

[Burt83] P. J. Burt and E. H. Adelson, "The laplacian pyramid as a compact image code," *IEEE Transactions on Communications*, vol. COM-31, 4, pp. 532-540, 1983. [Online]. Available: citeseer.ist.psu.edu/burt83 1 aplacian.html

[Noce06] J. Nocedal and S. Wright, *Numerical optimization*, 2nd ed. Springer, New York, 2006.

[Press07] W. H. Press, S. A. Teukolsky, W. T. Vetterling, and B. P. Flannery, *Numerical Recipes: The Art of Scientific Computing,* 3rd ed. Cambridge University Press, 2007.

[Hart04] R. Hartley and A. Zisserman, *Multiple view geometry in computer vision,* 2nd ed. Cambridge University Press, 2004.

[Wimm08] M. Wimmer, F. Stulp, S. Pietzsch, and B. Radig, "Learning local objective functions for robust face model fitting," *Pattern Analysis and Machine Intelligence, IEEE Transactions on,* vol. 30, no. 8, pp. 1357-1370, August 2008.

[Kel107] M. Keller, R. Knothe, and T. Vetter, "3D reconstruction of human faces from occluding contours," *Proceedings of the Mirage 2007,* March 2007.

[Koen90] J. J. Koenderink, *Solid shape.* The MIT Press, 1990.

What is claimed is:

1. A method of representing, modeling, or coding object properties of a 3-dimensional object by using global and local components of a plurality of resolutions to adjust a 3-dimensional model of a 3-dimensional object comprising the following method steps:
    breaking said object properties into 3-dimensional modes based on spatial frequency;
    segmenting high frequency 3-dimensional modes into regional segments corresponding to specific features of said 3-dimensional object properties and performing a coarse-to-fine transition of the modes via an approximating subdivision scheme;
    computing a Principal Component Analysis (PCA) of said regional segments individually;
    combining a hierarchy of global and local components which are gradually decreasing in size of support into a linear statistical model;
    wherein, by performing said method, a global to local model of at least a portion of the 3-dimensional object is obtained, wherein said 3-dimensional model is computed using a 3-dimensional surface model of said 3-dimensional object from said single photograph using said global and local components;
    wherein global and local features are stacked into a single feature vector;
    wherein different masks are used for different levels.

2. The method according to claim 1 wherein said local and global components comprise a vector.

3. The method according to claim 2 wherein a computer or non-transitory computer readable media is configured to determine said local and global components to determine the following vector:

$$x' := \begin{pmatrix} s^0 \\ s^1 \\ \vdots \\ s^{\tau-1} \end{pmatrix} \in R^{3m\tau}$$

where $s^0 := l_0 x_0 \in R^{3m}$ are the global features, and
are the global features wherein said vector is used to represent, model, or code object properties of the 3-dimensional object.

4. The method according to claim 1 wherein said local and global components comply with a covariance matrix.

5. The method according to claim 4 wherein a computer or non-transitory computer readable media is configured to determine said local and global components to determine with the following covariance matrix:

$$\Sigma = \frac{1}{n} XX^T = \frac{1}{n} BX'X'^T B^T.$$

, wherein said covariance matrix is used to represent, model, or code object properties of the 3-dimensional object.

6. The method according to claim 1 wherein said 3-dimensional model is obtained by using a plurality of object properties of the 3-dimensional object.

7. The method according to claim 1 wherein said 3-dimensional model is generated by said global and local components of said 3-dimensional object comprising the steps of acquiring data, computing correspondence between the data and a reference template and computing said global and local components.

8. The method according to claim 1 wherein said 3-dimensional model is modified using a 3-dimensional surface model of the 3-dimensional object.

9. The method according to claim 1 wherein an animation of said 3-dimensional model is computed using a 3-dimensional surface model of said 3-dimensional object.

10. The method according to claim 1 wherein said 3-dimensional object is reconstructed into a 3-dimensional model using a plurality of said object properties by using global and local components of said 3-dimensional object.

11. A method in a data processing system for representing, modeling, or coding object properties of a 3-dimensional object, wherein said data processing system includes a CCD-array, a display and an operating system, the method comprising the steps according to claim 1.

12. A data processing system for representing, modeling, or coding object properties of a 3-dimensional object, comprising a display and an operating system, wherein one or more data processors or software implemented using one or more data processors are configured to adjust a 3-dimensional model of the 3-dimensional object using global and local components of a plurality of resolutions, wherein said adjusting comprises the following method steps:
    breaking said objects properties into 3-dimensional modes based on spatial frequency;
    segmenting high frequency 3-dimensional modes into regional segments corresponding to specific features of said 3-dimensional object properties and performing a coarse-to-fine transition of the modes via an approximating subdivision scheme;
    computing a Principal Component Analysis of said regional segments individually;
    combining a hierarchy of global and local components which are gradually decreasing in size of support into a linear statistical model, wherein the data processing system creates a global to local model of at least a portion of the 3-dimensional object, wherein said 3-dimensional model is computed using a 3-dimensional surface model of said 3-dimensional object from said single photograph using said global and local components;
    wherein global and local features are stacked into a single feature vector;
    wherein different masks are used for different levels.

13. The method of claim 1, wherein the approximating subdivision scheme is a Catmull-Clark subdivision.

14. The data processing system according to claim 12, wherein the approximating subdivision scheme is a Catmull-Clark subdivision.

15. The method of claim 1, wherein the 3-dimensional object is a human face.

16. The data processing system according to claim 12, wherein the 3-dimensional object is a human face.

* * * * *